Jan. 22, 1963　　　F. H. DEAN　　　3,074,571
POWER TRANSMISSION ASSEMBLY FOR REFUSE
HANDLING VEHICLES
Filed July 1, 1958　　　　　　　　　　4 Sheets-Sheet 1

INVENTOR
Francis H. Dean

BY Cushman, Darby & Cushman
ATTORNEYS

Jan. 22, 1963   F. H. DEAN   3,074,571
POWER TRANSMISSION ASSEMBLY FOR REFUSE
HANDLING VEHICLES
Filed July 1, 1958   4 Sheets-Sheet 2
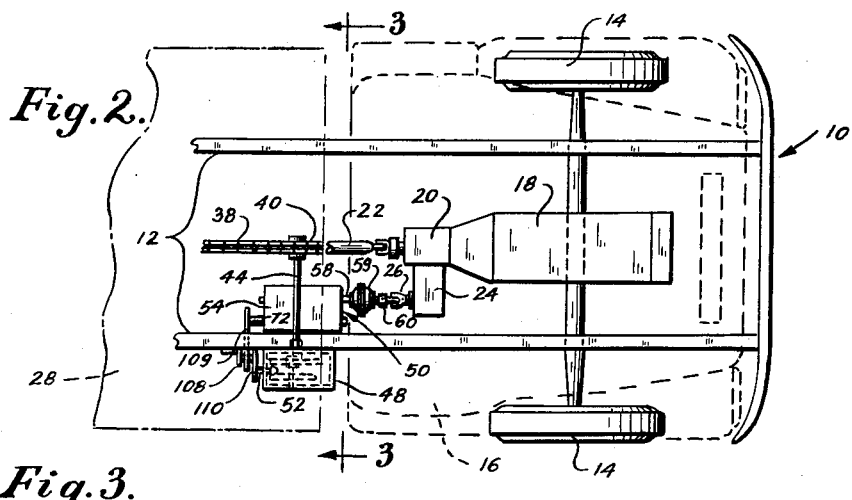
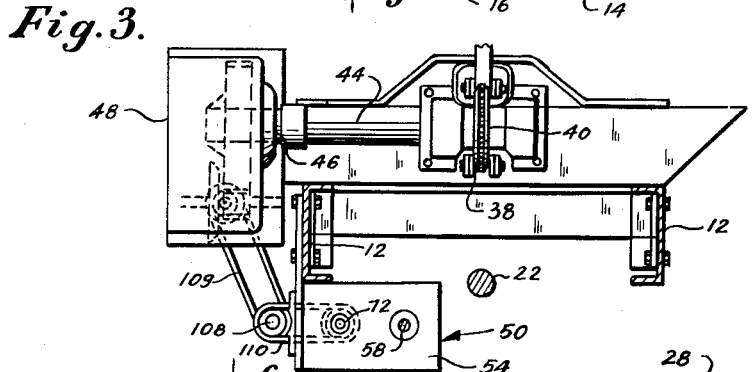
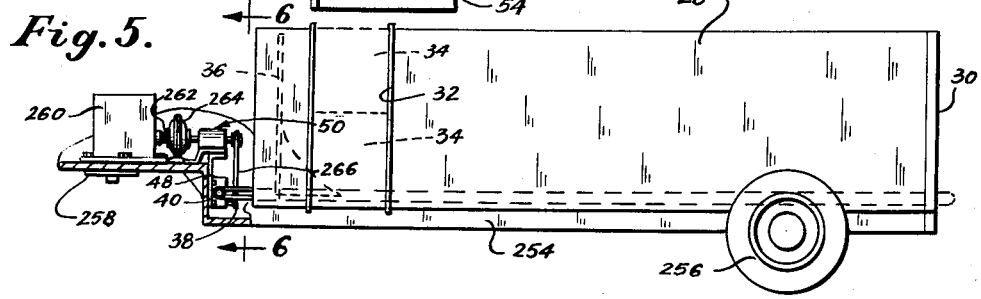
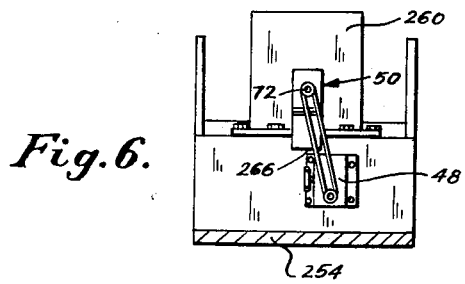
INVENTOR
Francis H. Dean
BY Cushman, Darby & Cushman
ATTORNEYS

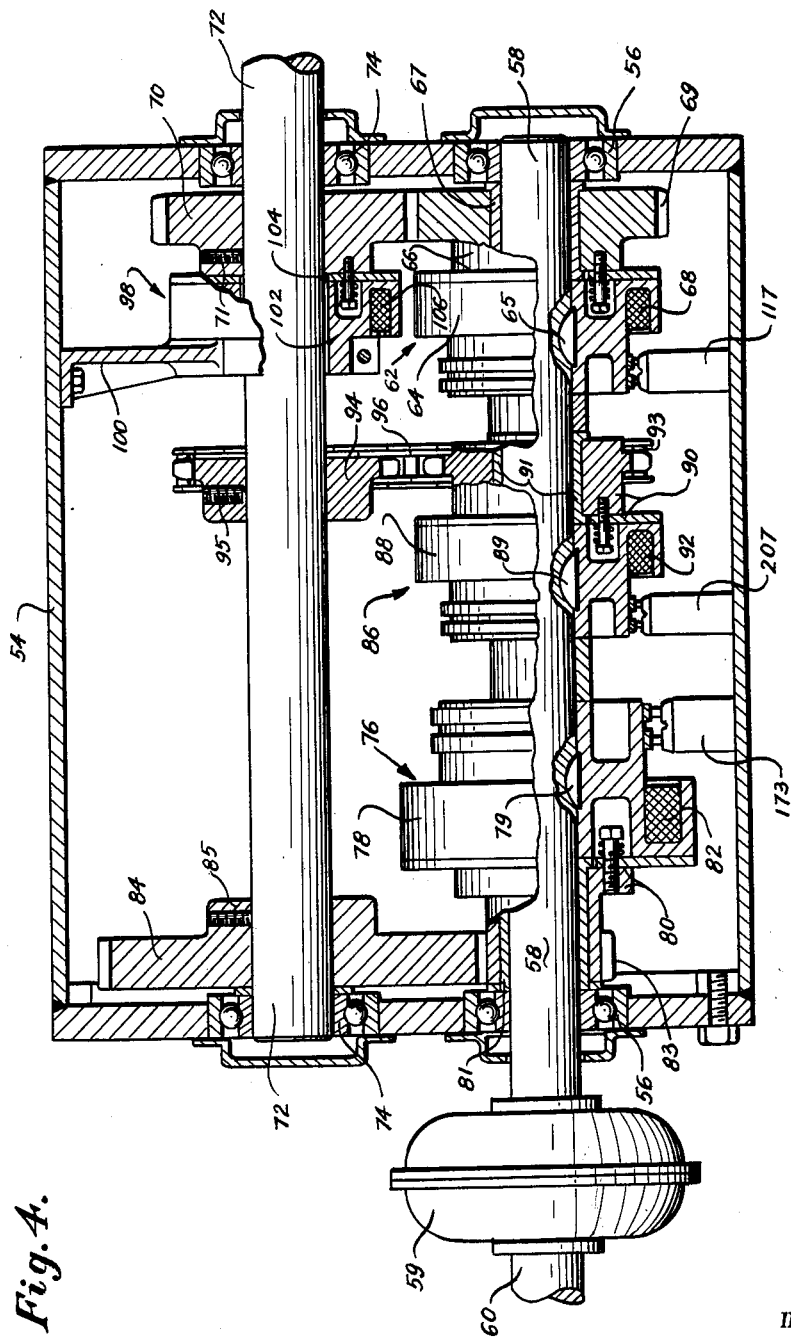

United States Patent Office 3,074,571
Patented Jan. 22, 1963

3,074,571
POWER TRANSMISSION ASSEMBLY FOR REFUSE HANDLING VEHICLES
Francis H. Dean, Houston, Tex., assignor to Pak-Mor Manufacturing Company, San Antonio, Tex., a corporation of Texas
Filed July 1, 1958, Ser. No. 745,902
25 Claims. (Cl. 214—82)

This invention relates to refuse handling vehicles and more particularly to an improved power transmission assembly for operating such refuse handling vehicles.

Refuse handling vehicles of the type embodying a refuse receptacle having a packer plate assembly removably mounted therein for compressing refuse deposited in the receptacle are well known, see, for example, Le Laurin patent, No. 2,557,003, issued June 12, 1951. Heretofore, the packer plate assembly of such vehicles has been moved by a power transmission assembly connected with the power take-off of the truck and embodying a fluid coupling operable to yield upon a predetermined torque and a worm gear transmission. Reversal of the movement of the transmission assembly was obtained by reversing the operation of the power take-off from the cabin of the truck.

The use of a fluid coupling alone is undesirable without dependable means for rendering it ineffective at the extreme ends of the packer plate travel, because its torque capacity is dependent upon the speed of the vehicle engine in such a manner that when operated at the high speed necessary to obtain desired packing forces in normal use, it is substantially a solid coupling between the engine and the packer plate assembly when the packer plate assembly is suddenly stopped at the end of its stroke. Moreover, the use of fluid coupling as a yieldable torque transmitter does not lend itself readily to automatic disengagement of power to the packer plate assembly at the extreme end of travel. While automatic power disengaging mechanisms were proposed in association with the fluid coupling, they were extremely undependable and quite costly and were not generally employed. Consequently, the packer plate assembly could strike the ends of the truck body or refuse receptacle with tremendous impact forces at the hands of careless operators. Such impact loads have resulted in breakage of packer chains and PTO transmissions.

In many conventional truck models, the rated horsepower transmitting capacity of the side-mounted PTO is insufficient to provide a high enough rate of travel for the packer plate assembly in combination with a high enough packing force so as to obtain both a minimum packing cycle time and a maximum load per cubic yard of refuse. Furthermore, because of the provision of the worm type gear transmission, which is inherently self-locking, problems were encountered in returning the packer plate assembly due to the effect of the compressed refuse in locking the gear transmission. This resulted from the fact that the packer plate could be propelled rapidly against the refuse, assisted by inertia forces amounting to three times the normal operating forces, and the self locking bearing could not be reversed through the same power train.

The above problems were solved to some extent by the improved power transmission assembly disclosed in copending Thurmond et al. application, Serial No. 558,673, filed January 12, 1956 which issued December 2, 1958, as Patent No. 2,862,632. In brief, the power transmitting assembly of the Thurmond et al. application included the provision of an electro-magnetic clutch which served not only as a motion transmitting means, but also as a yieldable torque transmitting means capable of slipping at a predetermined safe torque. The use of an electro-magnetic clutch simplified the provision of automatic packer power disengaging means. In addition, the Thurmond et al. power transmitting assembly embodied a non-self-locking gear transmission, which eliminated the problems instant to the worm gear transmission used previously. The power transmitting assembly of the Thurmond et al. application made more power available from a given truck than was available by the conventional side-mounted PTO by connecting the assembly directly with the drive shaft to the rear wheels. Nevertheless, in order to reverse the packer plate assembly, it was necessary for the operator to shift the gears of the main transmission, and this required that an operator remain in the cabin of the truck during normal operation and, further, positively limited the return speed of the packer plate assembly to a relatively low value.

It is desirable in the operation of refuse handling vehicles embodying a packer plate assembly to minimize the time required for a packing cycle of operation and, in addition, it is necessary to provide a maximum power to effect the necessary compression of the refuse. The power transmission assemblies heretofore utilized have embodied a single speed means for transmitting the power of the motor to the packer plate assembly to effect movement of the latter through the entire compression stroke. That is, the input power heretofore necessary had to provide both the necessary speed of travel and the necessary torque for compaction. Since the horsepower requirements of the motor and power transmission components are a function of both the force and velocity of the packer plate assembly, it has been necessary heretofore to provide a motor of a sufficient horsepower to handle both maximum speed conditions and maximum force conditions.

In the normal operation of refuse handling vehicles of the type described, the packer plate assembly is moved toward the rear of the refuse receptacle after a load of refuse has been deposited in the access opening therein. During the initial portion of this rearward travel of the packer plate assembly the deposited refuse is merely moved toward the rear end of the receptacle and, hence, the load on the packer plate assembly is relatively small and the force necessary for this movement is relatively low. As stated above, it is highly desirable to effect this initial movement with relatively high speed. Toward the end of the rearward movement, the refuse becomes compacted in the rear end of the receptacle and the force requirements of the packer plate assembly immediately increase. Of course, on the return stroke, the only load is that of the packer plate assembly itself and this should advantageously be accomplished with maximum speed. The compressed refuse tends to expand and to start the packer plate travelling in reverse, or toward the cab of the truck, with considerable speed because the packer plate is no longer held against the load by self locking gearing. A brake is provided to overcome this tendency in such a manner that whenever the packer plate driving mechanism is disengaged, the brake is set to stop and hold the packer plate. Since the unloading cycle is performed relatively infrequently, speed of operation is not a significant factor.

Accordingly, it is an object of the present invention to provide a power transmission assembly for a refuse handling vehicle of the type described having improved means for efficiently transmitting the power into high speed of the packer plate assembly travel when the same is lightly loaded and into high force travel when heavily loaded so as to obtain a minimum packing cycle time and a maximum packing force from a minimum power source.

Another object of the present invention is the provision of a power transmitting assembly of the type described which is automatically operable to transmit either high speed or high torque in response to the demand during a packing cycle.

Still another object of the present invention is the provision of a power transmitting assembly for a refuse handling vehicle of the type described having improved means for effecting a high speed-low force initial movement of the packer plate assembly through its compression stroke and a subsequent low speed-high force movement thereof in response to a resistance to the high speed-low force movement of a predetermined amount.

A further object of the present invention is the provision of a power transmitting assembly for refuse handling vehicles of the type described which may be conveniently controlled by remote means outside the vehicle cab.

A still further object of the present invention is the provision of a power transmitting assembly for a refuse handling vehicle of the type described having improved means for automatically disengaging the same at the extreme ends of the travel of the packer plate assembly.

Still another object of the present invention is the provision of a power transmitting assembly for a refuse handling vehicle of the type described embodying electromagnetic or other suitable clutches and an improved electrical circuit having built in means for controlling the operation of the clutches so that the cycle of operation of the packer plate assembly is automatic, thus eliminating the dangers incident to operation of the vehicles by careless attendants.

Still another object of the present invention is to provide a packer plate power train, including a fluid coupling to operate as a slip member when the packer plate movement is resisted at a predetermined pressure by compacted refuse and an electrically controlled clutch which automatically disconnects power to the packer plate at the extreme ends of its travel.

Still another object of the present invention is to provide a brake on the output side of the power transmission means for stopping immediately and for holding the packer plate in whatever position it may have been propelled under power, in such a manner that the holding brake is energized when the electrically controlled driving clutches are de-energized and vice versa.

Still another object of the present invention is to provide a prime mover of minimum possible size integral with a refuse compactor mechanism in such a manner that no connection is required between the truck propelling engine and the compactor mechanism facilitating the mounting of such a compactor body upon a truck or trailer chassis, eliminating much of the labor and other expense usually associated with connections to the truck engine PTO. The truck body needs only to be bolted down to the chassis.

A still further object of the present invention is the provision of a power transmission assembly of the type described which is simple and compact in construction, efficient in operation and economical to manufacture.

These and other objects of the present invention will become more apparent during the course of the following detailed description and appended claims.

The invention may best be understood with reference to the accompanying drawings wherein illustrative embodiments are shown.

In the drawings:

FIGURE 2 is a fragmentary top plan view of the vehicle showing the vehicle body in phantom for purposes of clearer illustration;

FIGURE 3 is a cross-sectional view along the line 3—3 of FIGURE 2;

FIGURE 4 is an enlarged fragmentary cross-sectional view taken substantially along the line 4—4 of FIGURE 1;

FIGURE 5 is a side elevational view of a trailer-type refuse handling vehicle embodying the principles of the present invention;

FIGURE 6 is an enlarged fragmentary cross-sectional view taken along the line 6—6 of FIGURE 5.

Figure 1:
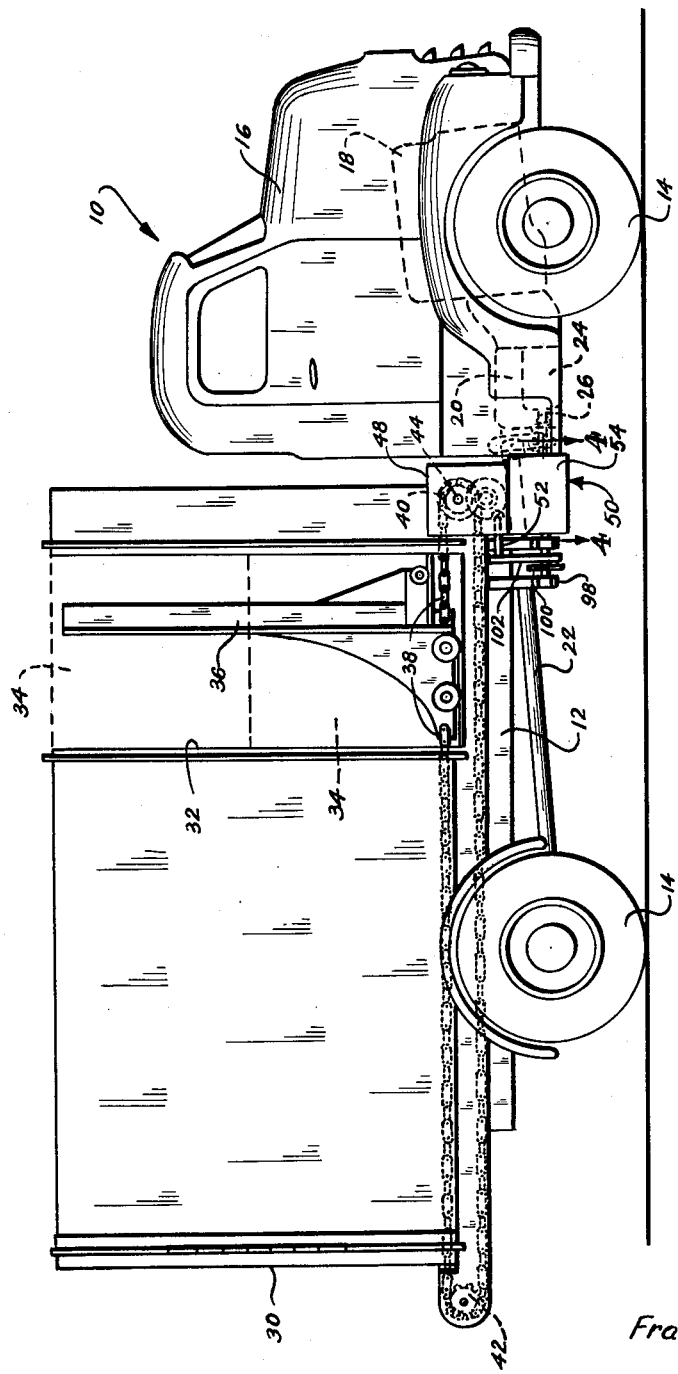
FIGURE 1 is a side elevational view of a truck-type refuse handling vehicle embodying the principles of the present invention.

Referring now more particularly to FIGURES 1–4, there is shown a refuse handling truck, generally indicated at 10, embodying the principles of the present invention. The truck 10 includes the usual frame 12 mounted on wheels 14 and having a cabin 16 positioned at the front end thereof. Mounted within the cabin is the usual motor 18 and a transmission assembly 20 of conventional construction is connected with the motor for driving the rear wheels of the truck through a drive shaft 22. Operatively connected with the transmission assembly 20 is a conventional side power take-off assembly 24 having an output shaft 26.

The rear portion of the frame 12 has mounted thereon a vehicle body 28 in the form of a cylindrical refuse receptacle, preferably of the type disclosed in the aforementioned Le Laurin patent. The refuse receptacle includes a pair of rear discharge doors 30 pivoted about vertical axes on the sides of the receptacle for movement between an open position, exposing the entire interior of the receptacle and a closed locked position. Any suitable means may be provided for locking the doors in their closed position. The forward end of the receptacle is provided with openings 32 for receiving the refuse and these openings may be closed by any suitable means, such as doors 34 or the like.

Mounted within the refuse receptacle for longitudinal movement therein is a packer plate assembly, generally indicated at 36, which is operable in a forward limiting position to permit refuse to be deposited in the receptacle through the openings 32 rearwardly thereof and movable from such position toward a rearward limiting position to compress the refuse against the rear doors. Preferably, the packer plate assembly is constructed in the same manner as disclosed in the aforementioned Le Laurin patent and is driven by a flexible chain 38 trained about longitudinally spaced forward and rearward sprocket wheels 40 and 42 and having one end secured to the forward end of the packer plate assembly and its opposite end secured to the rear end thereof.

The forward sprocket wheel 40 is fixedly secured to a horizontal transversely extending shaft 44 suitably journaled on the forward end of the truck frame and having a laterally extending end thereof connected with an output shaft 46 of a non-self-locking gear train assembly 48 (schematically illustrated in the drawings) of a construction similar to that illustrated in the aforementioned Thurmond et al. application.

The structure thus far described is well known and forms no part of the present invention, except insofar as it cooperates with the novel features of the present invention to form an operative combination. The present invention is more particularly concerned with an improved power transmission assembly, generally indicated at 50, for connection between the output shaft 26 of the power take-off assembly 24 and an input shaft 52 of the gear train assembly 48.

As best shown in FIGURE 4, the power transmission assembly 50 includes a housing 54, of any desired construction suitably mounted on the vehicle frame, preferably adjacent the forward end of the refuse receptacle 28. The particular position of the housing and the manner in which it is secured to the frame will vary depending on the construction of the truck employed. Mounted within the housing 54, as by ball bearings 56 or the like, is an input shaft 58 having mounted on its forward end outside of the housing 54 a conventional fluid coupling 59. The opposite end of the fluid coupling 59 is connected with the output shaft 26 of the power take-off assembly 24 by any suitable means, such as a universally connected stub shaft 60. Mounted on the rear end of the shaft 58 within the housing is a high speed compression stroke electromagnetic clutch 62, of any suitable construction, embodying a fixed element 64 rigidly secured to the input shaft 58, as by key 65, for movement therewith and a rotary element 66 independently journaled on the shaft 58, as by bearing sleeve 67, for rotation relative thereto. The electro-magnetic clutch 62 also includes a coil 68 on the fixed element 64 which is energized to electro-magnetically interconnect the fixed element with the rotary element so that the latter will be moved by the former. Rigidly secured to the rotary element 66 is a spur gear 69, whih meshes with a cooperating spur gear 70 fixed by any suitable means, such as set screw 71, to an output shaft 72 journaled in the housing, as by ball bearings 74, in a position parallel with the input shaft.

Mounted on the forward end of the input shaft 58 is a high torque compression stroke electromagnetic clutch, generally indicated at 76. As before, the electro-magnetic clutch may be of any suitable construction and generally includes a fixed element 78 secured, as by key 79, to the input shaft for rotation therewith and a rotary element 80 independently mounted on the shaft, as by bearing sleeve 81, for rotation relative thereto. As before, the clutch 76 includes a suitable energizing coil 82 carried by the fixed element 78 operable to interconnect the fixed element and the rotary element so that the latter will be driven by the former. The rotary element 80 of the electro-magnetic clutch 76 has a spur gear 83 fixed thereto of a size less than spur gear 69. A large spur gear 84 is fixed, as by set screw 85, on the forward end of the output shaft 72 in meshing engagement with the gear 83.

A high speed retracting stroke electro-magnetic clutch 86 is mounted on the input shaft between clutches 62 and 76, and here again, the clutch 86 may be of any suitable construction, generally including a fixed element 88 rigidly secured to the input shaft 58, as by key 89, for rotation therewith and a rotary element 90 independently mounted on the input shaft, as by bearing sleeve 91, for rotation relative thereto. As before, the clutch 86 includes an energizing coil 92 operable to electro-magnetically intereconnect the fixed element 88 with the rotary element 90 so that the latter will be driven by the former. A sprocket wheel 93 is rigidly secured to the rotary element 90 of the clutch 86 and is drivingly connected with a sprocket wheel 94 fixedly secured, as by set screw 95, to the output shaft 72 by an endless chain 96.

An electro-magnetic brake of conventional construction, generally indicated at 98, is fixedly carried by a bracket 100 rigidly secured to the housing 54 by any suitable means, as shown in FIGURE 4. The brake 98 is similar in construction to the clutches previously described and includes an element 102 fixed to the bracket and freely receiving the shaft 72. A rotary element in the form of a plate 104 is mounted, by any suitable means, on the gear 70 for rotation therewith and longitudinal movement with respect thereto. The fixed element 102 has a coil 106, which, when energized, serves to magnetically attract the plate 104 and move the same into engagement with the fixed element.

The electro-magnetic clutch 62 when energized will rotate the output shaft 72 in one direction at a relatively high speed. The electro-magnetic clutch 76 will rotate the shaft in the same direction at a relatively low speed. Finally, the electro-magnetic clutch 86 will effect an opposite rotation of the output shaft 72 at a relatively high speed. The brake 98 is released upon energization of any of the clutches and actuated in response to their de-energization.

It should be understood that the clutches, 62, 76 and 86 and the brake 98 are illustrated as being of the electromagnetic type, but that it is also possible to employ hydraulically or pneumatically actuated, electrically controlled clutches for the same effect. For example, hydraulically actuated clutches may be operated with fluid circulated by means of a pump driven by the motor. The flow of the fluid could be controlled by solenoid actuated valves responsive to the same electrical system.

The output shaft 72 is connected with the input shaft 52 of the gear train assembly 48 by any suitable means, such as an auxiliary shaft 108 suitably journaled on the truck frame 12 and connected with the output shaft 72, as by a sprocket chain 109 trained about sprocket wheels carried by the respective shafts. The auxiliary shaft 108 is connected, in turn, with the input shaft 52 of the gear train assembly 48 by a second sprocket chain 110 trained about sprocket wheels carried by the respective shafts.

Figure 7:
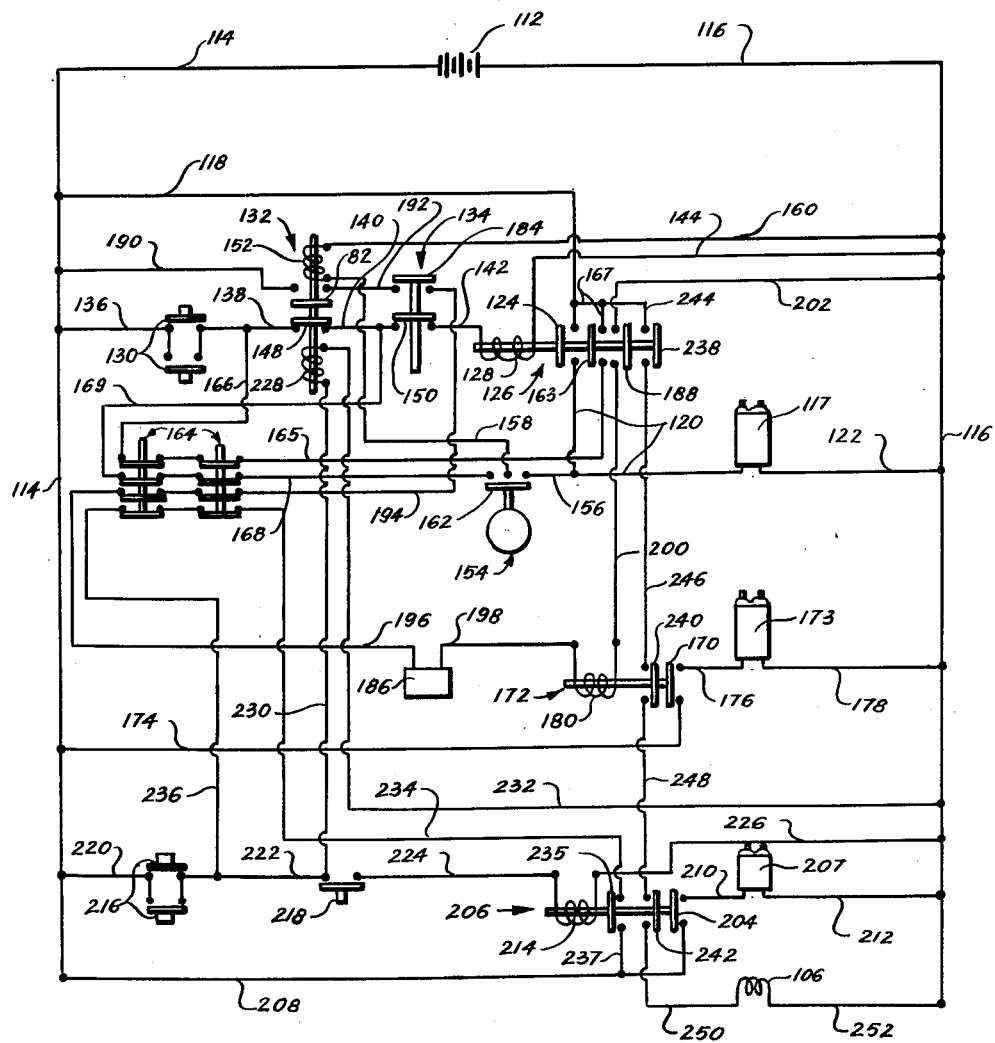
FIGURE 7 is a schematic wiring diagram of the electrical control circuit for the power transmission assembly.

Referring now more particularly to FIGURE 7, there is shown an electrical circuit for controlling the operation of the electro-magnetic clutches 62, 76 and 86 and the electro-magnetic brake 98. The circuit includes a battery 112 having main power lines 114 and 116 connected therewith. The energizing coil 68 of the electromagnetic clutch 62 is connected across the power lines 114 and 116 by a current feeding device 117 and leads 118, 120 and 122, the leads 118 and 120 having a normally open switch contact 124 of a relay 126 connected therebetween. The relay 126 includes a coil 128, which is energized to close the switch contact 124 and is connected in series across the power lines 114 and 116 with a pair of parallel starting buttons 130, a relay 132 and a limit switch 134 through leads 136, 138, 140, 142 and 144. The starting buttons 130 are of any suitable construction arranged to complete the series circuit between the leads 136 and 138 when pressed by the operator.

The relay 132 is preferably of the double coil latching type and includes a switch contact 148 which, when closed, serves to connect the leads 138 and 140. The limit switch 134 may also be of any suitable construction, preferably of the normally closed type including contact 150 arranged to complete the circuit when closed between the leads 140 and 142 and operable to be opened in response to the movement of the packer plate assembly into its rearward limiting position. The limit switch contact 150 may be actuated by engagement with the packer plate assembly itself by engagement with suitable abutment means carried by the chain 38, or by any other arrangement effective to open the same in response to the movement of the packer plate assembly into its rearward limiting position.

The relay 132 includes a first coil 152 which, when energized, is arranged to open the switch contact 148 and to this end, the coil 152 is connected between the main power lines 114 and 116 in series with the switch contact 124 of the relay 126 and a centrifugal switch 154 through leads 118, 120, 156, 158 and 160. The centrifugal switch 154 may be of any suitable construction, preferably connected with the output side of the electro-magnetic clutch 62 for rotation therewith and includes a contact 162 arranged to connect the leads 156 and 158 in response to a predetermined rotation thereof.

The coil 128 of the relay 126 includes an initial holding circuit connected across the main power lines 114 and 116 in series with a second normally open switch contact 163 of the relay 126, a pair of series connected stop buttons 164, switch contact 148 of relay 132 and contact 150 of the limit switch 134. Thus, the initial holding circuit includes a lead 165 connected with one end of the switch contact 163 and with one end of the stop buttons 164. A second lead 166 is connected with the other end of the stop buttons 164 and with the lead 138. The opposite side of the switch contact 163 is connected in parallel with the lead 118, as by a lead 167.

There is also provided a secondary holding circuit for the coil 128 of the relay 126 connected across the main power lines 114 and 116 in series with switch contact 124 of the relay 126, contact 162 of the centrifugal switch 154, the stop buttons 164 and contact 150 of the limit switch 134. Thus, the secondary holding circuit includes a lead 168 arranged to be connected at one end with the lead 156 when the contact 162 of the centrifugal switch 154 is closed and at its other end with one end of the stop buttons 164. A second lead 169 is connected with the other end of the stop buttons 164 and with the lead 140.

The coil 82 of the electro-magnetic clutch 76 is connected across the main power lines 114 and 116 in series with a switch contact 170 of a relay 172 by a current feeding device 173 and leads 174, 176 and 178. The relay 172 may be of any suitable construction and includes a coil 180 connected across the main power lines 114 and 116 in series with a second switch contact 182 of relay 134, a second contact 184 of limit switch 134, the stop buttons 164, a time trip switch 186 and a second switch contact 188 of the relay 126 by leads 190, 192, 194, 196, 198, 200 and 202. The time trip switch may be of any suitable construction, as for example a conventional bimetallic thermostatic switch, arranged to open the circuit a predetermined time period (e.g., 12 seconds) after it has been energized.

The coil 92 of the electro-magnetic clutch 86 is connected across the main power lines 114 and 116 in series with a normally open switch contact 204 of a relay 206, as by a current feeding device 207 and leads 208, 210 and 212. The relay 206 has a coil 214 which is energized to close the switch contact 204 and is connected across the main power lines 114 and 116 in series with a pair of parallel normally open starting buttons 216 and a limit switch 218 through leads 220, 222, 224, and 226. The buttons 16 are preferably similar to buttons 130 and limit switch 218 is similar to limit switch 132, but is adapted to open in response to the movement of the packer plate assembly into its forward limiting position.

The relay 132 includes a second coil 228 which is energized to close the switch contact 148 and to open the switch contact 182 thereof. The coil 228 is connected across the main power lines 114 and 116 through leads 220, 222, 230 and 232 in series with the starting buttons 216 so as to be energized when either one of the latter is pushed. In addition, there is provided a holding circuit for the relay 206 connected across the main power lines 114 and 116 in series therewith and with the stop buttons 164 and limit switch 218. Thus, the holding circuit includes a lead 234 connected with one side of a second normally open switch contact 235 of the relay 206 and with one end of the stop buttons 164. A second lead 236 is connected with the other end of the stop buttons 164 and with the lead 222. The opposite side of the switch contact 235 is connected in parallel with the lead 208, as by a lead 237.

The coil 106 of the electro-magnetic brake 98 is energized to apply the brake upon completion of a circuit across additional normally closed switch contacts 238, 240 and 242 of the relays 126, 172 and 206, respectively, connected in series with the coil across the main lines 114 and 116 by leads 118, 167, 244, 246, 248, 250, and 252.

It will be understood that the present invention is not limited in its application to the embodiment illustrated in FIGURES 1–4 wherein the refuse receptacle 28 is mounted on a conventional truck frame. In FIGURES 5 and 6, there is shown a modification in which the refuse receptacle 28 is mounted on a trailer frame 254 having rear wheels 256 and a fifth wheel assembly 258 for connection with a conventional tractor truck (not shown) to be propelled thereby. In this embodiment, an auxiliary engine 260 is suitably mounted on the trailer frame 254 adjacent the fifth wheel assembly 258 thereof to drive the packer plate assembly 36, rather than utilizing the power of the tractor truck motor. The auxiliary engine 260 includes an output shaft 262, which is connected with the input shaft of a conventional fluid coupling 264 having its output shaft suitably connected to the input shaft 58 of the power transmission assembly 50 previously described. As before, the output shaft 72 of the assembly 50 is suitably connected with the gear train assembly 48, as by sprocket and chain assembly 266, and the latter serves to drive the packer plate assembly 36. Of course, the electrical control circuit described above in connection with the embodiment disclosed in FIGURES 1–4 is utilized to control the transmission assembly 50.

It will also be understood that this general arrangement, embodying a separate packer operating engine, is applicable to a truck body, eliminating the necessity for connection to the truck engine. A truck body so equipped need only to be secured to the truck chassis, thereby simplifying installation.

*Operation*

It will be understood that in the normal operation of either of the embodiments, refuse is deposited in the openings 32 with the packer plate assembly 36 disposed in its forward limiting position. After sufficient refuse has been loaded at a given station, the packer plate assembly 36 is moved rearwardly to pick up the refuse deposited in the receptacle and to move the same toward the rear doors 30 and, finally, to compress the refuse thereagainst. After the refuse has been compressed, the packer plate assembly 36 is moved back to its forward limiting position. This cycle is repeated at successive loading stations until a complete compressed load of refuse is packed within the receptacle and then the vehicle is driven to a suitable discharge station. At the discharge station, the rear doors 30 are opened and the packer plate assembly 36 is moved to its rearward limiting position, which effects a discharge of the refuse contained in the receptacle 28. The packer plate assembly is then returned to its forward limiting position, the rear doors 30 closed and the vehicle is ready to again be filled.

With the above in mind, the actuation of the electrical circuit to achieve this operation semi-automatically with a minimum of manual manipulation of the attendant is as follows. Assuming that the packer plate assembly is disposed in its forward limiting position, the refuse has been deposited in the receptacle from the loading station through the openings 32 and the driving motor is in operation, switch contact 148 of relay 132 is closed and switch contact 182 thereof is opened, switch contacts 150 and 184 of the limit switch 134 are closed, switch contacts 188 and 238 of relay 126 are closed and switch contacts 124 and 163 thereof are opened, contact 162 of centrifugal switch 154 is opened, switch contact 170 of relay 172 is opened and contact 240 of the same relay is closed, switch contact 204 of relay 206 is opened, contact 235 is opened and contact 242 is closed and limit switch 218 is opened. To initiate operation, the attendant pushes either of the starting buttons 130, which serves to energize the relay coil 128 through a circuit including leads 136, 138, 140, 142 and 144 which closes the relay contact 124, completing a power circuit including leads 118, 120, and 122, to energize the coil 68 of the electro-magnetic clutch 62. The energization of coil 128 also closes contact 163 which completes the initial holding circuit for coil 128 through leads 118, 167, 165, 166, 138, 140, 142 and 144. Thus, when switch contact 163 of relay 126 closes, the initial holding circuit through leads 165 and 166 affords a parallel circuit for the energization of the coil 128 thereof so that even if the starting button 130 is immediately released, switch contact 124 will remain closed to energize the clutch 62 by the operation of the initial holding circuit.

It will be noted that before the operation is initiated, the circuit to the electro-magnetic brake coil 106 is completed through closed switch contacts 238, 240, and 242 and leads 118, 167, 244, 246, 248, 250 and 252. Of course, when the coil 128 of the relay 126 is energized upon initiation of operation, the switch contact 238 thereof is opened which interrupts the circuit to the coil 106 thus causing the brake to release.

Actuation of the coil 68 of the electro-magnetic clutch 62 serves to move the packer plate assembly 36 rearwardly through the operation of gears 69 and 70 which, in turn, drive the packer plate assembly through the gear train assembly 48. When the rotary movement reaches a predetermined r.p.m., the contact 162 of the centrifugal switch 154 is closed, which energizes the coil 152 of relay 132 through leads 156, 158 and 160 to open the switch contact 148 of the relay 132 and, hence, interrupt the initial holding circuit. At the same time, however, the secondary holding circuit through leads 168 and 169 is completed so that switch contact 124 of the relay 126 remains closed and the circuit to the coil 68 of the clutch 62 is uninterrupted. When coil 152 of relay 134 is energized, it also serves to close the switch contact 182 thereof, which sets up the circuit controlling the operation of the electro-magnetic clutch 76 so that it will be actuated when the coil 128 of relay 126 is de-energized to close switch contact 188.

The movement of the packer plate assembly 36 rearwardly will continue under the operation of electromagnetic clutch 62 until the deposited refuse has been moved to the rear of the receptacle 28 and a predetermined compression thereof is obtained. As noted above, the electro-magnetic clutch 62 is operable to effect a high speed-low torque movement of the packer plate assembly so that the fluid coupling will begin to slip at a relatively low resistance to the movement of the packer plate assembly. When this slippage occurs, the contact 162 of the centrifugal switch 154 will open, which de-energizes the coil 128 of the relay 126. With the coil 128 de-energized, switch contact 124 is first opened to interrupt the circuit to the coil 68 of the clutch 62 and, subsequently, to close the switch contact 188 which, in turn, completes a circuit to the coil 180 of the relay 172 through lead 190, closed contact 182, lead 192, closed contact 184, lead 194, stop button 164, lead 196, thermostatic switch 186, lead 198 and leads 200 and 202. The energization of relay coil 180 serves to close switch contact 170, which completes a circuit to the coil 82 of the electro-magnetic clutch 76 through leads 174, 176 and 178. The energization of relay coil also opens the switch contact 240 which, in turn, opens the brake coil actuating circuit.

When the electro-magnetic clutch 76 is energized, the packer plate assembly 36 is moved rearwardly at a relatively high torque and low speed through the operation of gears 83 and 84. Thus, the packer plate assembly will move rearwardly to compress the refuse against the doors 30 until slippage occurs. At a predetermined time according to the setting of the thermostatic switch 186, the energizing circuit to the relay coil 180 is interrupted by the operation of the thermostatic switch 186 which, in turn, effects an interruption of the energizing circuit to the clutch coil 82 by opening switch contact 170 of the relay 172. At the same time, switch contact 240 of relay 172 is closed which completes the circuit to the coil 106 to actuate the brake 98.

When the clutch 76 is de-energized the operator then pushes either of the starting buttons 216 which energizes the relay coil 214 through a circuit including leads 220, 222, 224 and 226 thus closing the relay contact 204 and completing a power circuit to the clutch coil 92 through leads 208, 210 and 212. When the coil 214 is energized switch contact 242 also closes and the holding circuit for the coil 214 is energized through leads 208, 237, 234, 236, 222, 224 and 226. Thus, either of the starting buttons may be immediately released and the coil 92 of the electro-magnetic clutch 86 will remain energized through the circuit 208, 210 and 212 as a result of the holding circuit energizing the relay coil 214. Energization of coil 214 also opens switch contact 242 of the relay 206 which interrupts the actuating circuit of the coil 106 and releases the brake.

In addition to the above, actuation of either of the starting buttons 216 serves to immediately energize the coil 228 of the relay 134 through the circuit including leads 220, 222, 230 and 232. When the coil 228 is energized, switch contact 148 is closed and switch contact 182 is opened to reset the relay for the next cycle of operation.

Of course, when the coil 92 of the electro-magnetic clutch 86 is energized, the packer plate assembly is moved forwardly through the operation of sprocket wheels 93 and 94 and chain 96. This movement will continue until the packer plate assembly reaches its forward limiting position, at which time the limit switch 218 is opened to de-energize the relay coil 214 and, hence, open switch contact 204 of the relay which, in turn, interrupts the energizing circuit for the coil of the clutch. At the same time, switch contact 242 of relay 206 is closed which completes the circuit to the coil 106 to actuate the brake 98.

The above procedure is repeated for each loading cycle and when it is desired to discharge the entire load received, the rear doors 30 are opened. The operator then pushes either of the starting buttons 130 which energizes the coil 68 of the electro-magnetic clutch 62 to effect initial movement of the packer plate assembly 36. When sufficient resistance is encountered, clutch 62 is de-energized and clutch 76 is energized in the manner indicated above so that the packer plate assembly 36 is moved rearwardly to discharge the compressed refuse through the operation of the low speed-high torque electro-magnetic clutch 76. When the packer plate assembly reaches its rearward limiting position, contact 184 of limit switch 132 is opened to interrupt the circuit energizing the coil 180 of relay 172. De-energization of the relay coil 180 causes switch contact 170 to open which, in turn, interrupts the energizing circuit to the clutch 76.

It will be noted that stop buttons 164 are connected in the electrical circuit so that either may be manually operated by the operator during any stage of the cycle to completely shut down the same. Thus, the operator may stop the operation at any time, but the circuit is such that once either of the starting buttons 130 are pushed the packer plate assembly 36 will be moved to compress the refuse against the doors 30 automatically. That is, rearward movement of the packer plate assembly will be initiated by the operation of the electro-magnetic clutch 62 and when a predetermined resistance to such movement is encountered, the clutch 62 is automatically de-energized and the clutch 76 automatically energized to complete the compressing of the refuse against the doors at low speed and high force. Power for the movement of the packer plate assembly 36 to compress the refuse is automatically disconnected at a given period of time.

The packer plate assembly is returned to its forward limiting position merely by the actuation of either of the starting buttons 216. It will be understood that the circuit could readily be made completely automatic throughout an entire cycle of operation by replacing the starting buttons 216 with a suitable switch adapted to be connected instantaneously only upon the movement of the armature of the relay 172 as a result of the de-energization of the coil 180. Of course, any other suitable arrangement for accomplishing this purpose may be provided. In addition, it will be understood that the energizing circuit for the clutch 76 could be interrupted in response to slippage in the power train, rather than in response to a predetermined time. For example, a centrifugal switch, such as the switch 154, could be embodied in the energizing circuit in a manner similar to that shown in the energizing circuit for the clutch 62.

The power transmission assembly of the present invention lends itself quite readily to remote operation by operators stationed outside the cab of the truck or tractor truck. For example, in many industrial installations where heavy loads are picked up at one station and, hence, several cycles of operation of the packer plate assembly are required to completely load the refuse, it has been necessary in the past for the operator to first load the refuse and then get into the cabin of the truck to effect operation of the packer plate assembly. With the present arrangement, the motor of the vehicle may be set at a predetermined throttle setting (as by a solenoid suitably connected in the control circuit) and the packer plate assembly operated adjacent the loading opening 32, as for example, by extending the starting buttons 130 and 216 and stop buttons 164 by suitable wires adjacent the loading station. In this manner, the operator may simply load the receptacle until it becomes necessary to pack the refuse loaded and operation of the packer plate assembly can be accomplished without the necessity of walking to the cabin of the vehicle. This same advantage is achieved in discharging the load at the discharge station, since the buttons may be operated by the operator adjacent the discharge doors after he has opened the same without the necessity of returning to the cabin to commence operation. This remote operation saves considerable time and effort on the part of the operator.

It can thus be seen that there has been provided a power transmission assembly for a refuse vehicle embodying a packer plate assembly. The transmission is such that a cycle of operation can be carried out semi-automatically merely by the operator pushing a starting button. By providing both a high speed-low torque electromagnetic clutch operation and a low speed-high torque electro-magnetic clutch operation for effecting movement of the packer plate assembly through its compression stroke, operational time is reduced to a minimum and the horsepower requirements to effect compression are reduced to a minimum. For example, where a single speed transmission is provided for effecting the compression stroke, the power input must be sufficient to achieve both the maximum speed and maximum force for compression. Thus, assuming a desired travel of 45 feet per minute and a necessary packing force of 50,000 pounds, a motor output of approximately 68 horsepower is required (where horsepower equals speed times force divided by 33,000 and losses are disregarded) with a single transmission. By providing both a high speed-low torque clutch transmission and a low speed-high torque transmission, the horsepower requirement can be reduced to at least one-half the size heretofore thought necessary without a reduction either in the optimum speed or the optimum force required. By providing a maximum speed where the force requirements are a minimum, for example, of a 2,000 pound force necessary merely to move the packer plate assembly and the uncompressed refuse, only a motor of three horsepower is required to effect a 45 feet per minute traversal of the packer plate assembly under the operation of the high speed-low torque clutch. For the purpose of compressing the refuse with a force of 50,000 pounds, the speed is reduced accordingly by the operation of the clutch 76, as for example, to 15 feet per minute, so that the horsepower requirement is 22½. Thus, a 25 horsepower motor is all that is required with the present arrangement to effect a compression stroke in the same amount of time and with the same force as that heretofore accomplished by a 68 horsepower and above. This is also quite significant in terms of the truck embodiment disclosed in FIGURES 1–4, since it enables the use of conventional side-mounted power take-offs. Heretofore, it was thought necessary to utilize a power take-off assembly, such as disclosed in the aforementioned Thurmond et al. application, connected in the drive shaft of the truck to satisfy the maximum power requirements. The present arrangement enables such installations to utilize the conventional side-mounted power take-off and reduces the auxiliary power requirements heretofore thought necessary in trailer installations. Thus, an overall saving in cost is secured while, at the same time, all of the advantageous features of the prior art arrangements are retained.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. In a vehicle having motor means, the combination comprising: a vehicle body defining a refuse receptacle having an opening therein for receiving refuse and spaced discharge door means at one end thereof; a packer plate assembly mounted in said receptacle for movement toward and away from said door means, said packer plate assembly being operable during its movement toward said door means to move the refuse deposited in said receptacle through said opening toward said door means and to compress the refuse thereagainst when closed and to move the compressed refuse out of the receptacle through said door means when open; and power transmission means for connection with the motor means of the vehicle to move said packer plate assembly, said power transmission means including first means operable to effect a high speed-low force movement of said packer plate assembly toward said door means, first clutch means engageable to operate said first means, second means operable to effect a low speed-high force movement of said packer plate assembly, second clutch means engageable to operate said second means, third means operable to effect a high speed movement of said packer plate assembly away from said door means, and third clutch means engageable to operate said third means.

2. The combination as defined in claim 1 wherein means is provided for disengaging said first clutch means and engaging said second clutch means in response to a predetermined resistance to the high speed-low force movement of said packer plate assembly.

3. The combination as defined in claim 1 wherein means is provided for disengaging said second clutch means after a predetermined time period of operation.

4. The combination as defined in claim 1 wherein said clutch means are electro-magnetic clutches and wherein an electrical circuit is provided for controlling the operation of said electro-magnetic clutches.

5. The combination as defined in claim 4 wherein said circuit includes remote switch means on the outside of the vehicle for controlling said circuit.

6. The combination as defined in claim 4 wherein said circuit includes limit switch means for de-energizing the electro-magnetic clutch operable when said packer plate assembly reaches either extreme end of its travel.

7. The combination as defined in claim 1 wherein said power transmission means also includes a fluid coupling between the motor means of the vehicle and all of said clutch means operable to slip in response to a predetermined resistance to the compression of the refuse against said closed door means.

8. The combination as defined in claim 1 wherein said power transmission means further includes brake means between all of said clutch means and said packing plate assembly operable in response to the disengagement of all of said clutch means to retain said packer plate assembly in the position into which it has been moved.

9. In a vehicle having motor means, the combination comprising: a vehicle body defining a refuse receptacle having an opening therein spaced from one end thereof for receiving refuse, a packer plate assembly mounted in said receptacle for movement toward and away from said one end thereof, said packer plate assembly being operable during its movement toward said receptacle end to move the refuse deposited in said receptacle through said opening toward said receptacle end and to compress the same thereagainst, and power transmission means for connection with the motor means of the vehicle to move said packer plate assembly, said power transmission means including first electro-magnetic clutch means, means operable in response to the energization of said first electro-magnetic clutch means for effecting an initial high speed-low force movement of said packer plate assembly toward said receptacle end to move the deposited refuse toward the same, second electro-magnetic clutch means, and means operable in response to the energization of said second electro-magnetic clutch means for effecting a subsequent low speed-high force movement of said packer plate assembly to compress the refuse against said receptacle end.

10. The combination as defined in claim 9 wherein means is provided for de-energizing said first electro-magnetic clutch means and energizing said second electro-magnetic clutch means in response to a predetermined resistance to the high speed-low force movement of said packer plate assembly.

11. The combination as defined in claim 9 wherein means is provided for de-energizing said second electro-magnetic clutch means in response to a predetermined time period of operation.

12. A power transmission assembly for effecting the movement of a refuse packer plate assembly or the like through a compression stroke and a return stroke comprising means for connection with a power source to be driven thereby, means for connection with the packer plate assembly to drive the same, and electrically controlled clutch transmission means connecting said driven means and said driving means operable to effect a high speed-low force movement of said packer plate assembly through said strokes so long as the resistance to such movement is less than a predetermined amount and to effect a low speed-high force movement of the packer plate assembly through a portion of its compression stroke in response to an increase in such resistance beyond said predetermined amount.

13. A power transmission assembly for moving a refuse packer plate assembly or the like through a compression stroke comprising means for connection with a power source to be driven thereby, means for connection with the packer plate assembly to drive the same, and electrically controlled clutch transmission means connecting said driven means and said driving means operable to effect a high speed-low force movement of said packer plate assembly through said compression stroke so long as the resistance to such movement is less than a predetermined amount and to effect a low speed-high force movement of said packer plate assembly through a portion of said compression stroke in response to an increase in such resistance beyond said predetermined amount.

14. A power transmission assembly as defined in claim 13 wherein said transmission means comprises a first clutch, means operable in response to the engagement of said first clutch for effecting said high speed-low force movement of said packer plate assembly, a second clutch, means operable in response to the engagement of said second clutch for effecting the low speed-high force movement of said packer plate assembly, and means operable in response to a resistance to the high speed-low force movement of the packer plate assembly of said predetermined amount for disengaging said first clutch and engaging said second clutch.

15. A power transmission assembly as defined in claim 13 wherein said transmission assembly includes a housing having a pair of parallel shafts mounted therein, one of said shafts being connected with said driven means and the other of said shafts being connected with said driving means, said one shaft having first and second electro-magnetic clutches mounted thereon, gear means on said shafts operatively connected to said clutch to rotate said other shaft to effect said high speed-low force movement and said low speed-high force movement respectively in response to the energization of said first and second electro-magnetic clutches respectively, electrical circuit means for controlling the operation of said electro-magnetic clutches, said circuit including means for selectively energizing said electro-magnetic clutches and means operable during the high speed-low force movement of said packer plate assembly in response to an increase in the resistance to such movement beyond said predetermined amount for de-energizing said one electro-magnetic clutch and energizing said other electro-magnetic clutch.

16. A power transmission assembly for effecting the movement of a refuse packer power plate assembly or the like through a compression stroke comprising means for connection with a power source to be driven thereby, means for connection with a packer plate assembly for driving the same, and transmission means for connecting said driven means and said driving means, said transmission means including first electro-magnetic clutch means, means operable in response to the energization of said first electro-magnetic clutch means for effecting an initial high speed-low force movement of the packer plate assembly through its compression stroke, second electro-magnetic clutch means, and means operable in response to the energization of said second electro-magnetic clutch means for effecting a subsequent low speed-high force movement of the packer plate assembly through its compression stroke.

17. A power transmission assembly as defined in claim 16 including an electrical circuit for controlling the operation of said electro-magnetic clutch means, said circuit including means for de-energizing said first electro-magnetic clutch means and energizing said second electro-magnetic clutch means in response to a predetermined resistance to the high speed-low force movement of the packer plate assembly.

18. A power transmission assembly as defined in claim 17 wherein said circuit includes means for automatically de-energizing said second electro-magnetic clutch means after a predetermined time period of operation.

19. A power transmission assembly as defined in claim 16 including an electrical circuit for controlling the operation of said electro-magnetic clutch means, said circuit including means operable during the energization of said second electro-magnetic clutch means for automatically de-energizing the same in response to a predetermined time period of operation.

20. A power transmission assembly as defined in claim 16 wherein said transmission means also includes an electro-magnetic brake means.

21. A power transmission assembly as defined in claim 20 including an electrical circuit for controlling the operation of said electro-magnetic clutch means and said electro-magnetic brake means, said circuit including means for energizing said electro-magnetic brake means in response to the de-energization of said second electro-magnetic clutch means and for de-energizing said electro-magnetic brake means in response to the energization of either of said electro-magnetic clutch means.

22. In a refuse handling vehicle, having motor means, the combination comprising: a vehicle body defining a refuse receptacle having an opening therein for receiving refuse and spaced discharge door means at one end thereof; a packer plate assembly mounted in said receptacle for movement toward and away from said door means, said packer plate assembly being operable during its movement toward said door means to move refuse deposited in said receptacle through said opening toward said door means and to compress the refuse thereagainst when closed and to move the compressed refuse out of the receptacle through said door means when open; and power transmission means operatively connected with said packer plate assembly to drive the same and operatively connectible with the motor means of the vehicle to be driven thereby, said power transmission means including forward transmission means operable to effect movement of said packer plate assembly toward said door means, forward clutch means engageable to operate said forward transmission means, reverse transmission means operable to effect movement of said packer plate assembly away from said door means, reverse clutch means engageable to operate said reverse transmission means, and brake means operatively connected between said packer plate assembly and said forward and reverse clutch means engageable in response to the disengagement of said forward clutch means to maintain said packer plate in the position into which it has been moved and disengageable in response to the engagement of either of said clutch means.

23. The combination as defined in claim 22 including a fluid coupling operatively connected with said power transmission means between the latter and the motor means of the vehicle.

24. In a refuse handling vehicle having motor means, the combination comprising: a vehicle body defining a refuse receptacle having an opening therein for receiving refuse and spaced discharge door means at one end thereof; a packer plate assembly mounted in said receptacle for movement toward and away from said door means, said packer plate assembly being operable during its movement toward said door means to move the refuse deposited in said receptacle through said opening toward said door means and to compress the refuse thereagainst when closed and to move the compressed refuse out of the receptacle through said door means when open; power transmission means operatively connected with said packer plate assembly to drive the same and operatively connectible with the motor means of the vehicle to be driven thereby, said power transmission means including forward transmission means operable to effect movement of said packer plate assembly toward said door means, forward clutch means engageable to operate said forward transmission means, reverse transmission means operable to effect movement of said packer plate assembly away from said door means, reverse clutch means engageable to operate said reverse transmission means, means operatively conencted with said forward clutch means to disengage the latter from said forward transmission means in response to a predetermined resistance to movement of said packer plate assembly towards said closed door means, and a fluid coupling operatively connected with said power transmission means between the latter and the motor means of the vehicle operable to slip in response to a predetermined resistance to the movement of the packer plate assembly toward said closed door means.

25. In a refuse handling vehicle having motor means, the combination comprising: a vehicle body defining a refuse receptacle having an opening therein for receiving refuse and spaced discharge door means at one end thereof; a packer plate assembly mounted in said receptacle for movement toward and away from said door means between two extreme positions, said packer plate assembly being operable during its movement toward said door means to move refuse deposited in said receptacle through said opening toward said door means and to compress the refuse thereagainst when closed and to move the compressed refuse out of the receptacle through said door means when open; and power transmisison means operatively connected with said packer plate assembly to drive the same and operatively connectible with the motor means of the vehicle to be driven thereby, said power transmission means including a fluid coupling operable to yield in response to a predetermined compression of the refuse against said door means by said packer plate assembly, electrically controlled clutch means engageable to effect movement of said packer plate assembly and disengageable to prevent movement of said packer plate assembly, and an electrical circuit for controlling said clutch means, said circuit including means operable in response to the movement of said packer plate assembly into either of its extreme positions for disengaging said clutch means, and means operatively connected to said clutch means to disengage the latter from said power transmisison means in response to a predetermined resistance to movement of said packer plate assembly towards said discharge door means.

References Cited in the file of this patent
UNITED STATES PATENTS

| 1,650,594 | Bing | Nov. 29, 1927 |
| 1,814,424 | Barr | July 14, 1931 |
| 2,302,005 | Caves | Nov. 17, 1942 |
| 2,548,175 | Schellinger | Apr. 10, 1951 |
| 2,696,925 | Laurin | Dec. 14, 1954 |
| 2,777,588 | Williams | Jan. 15, 1957 |
| 2,808,158 | Gilleo | Oct. 1, 1957 |
| 2,856,046 | Bofinger | Oct. 14, 1958 |
| 2,862,632 | Thurmond et al. | Dec. 2, 1958 |
| 2,932,415 | Brown | Apr. 12, 1960 |